United States Patent
Swarna et al.

(10) Patent No.: US 10,386,916 B2
(45) Date of Patent: *Aug. 20, 2019

(54) SUPPLY-VOLTAGE CONTROL FOR DEVICE POWER MANAGEMENT

(71) Applicant: NVIDIA Corporation, Santa Clara, CA (US)

(72) Inventors: Madhu Swarna, Portland, OR (US); Tezaswi Raja, San Jose, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/950,090

(22) Filed: Apr. 10, 2018

(65) Prior Publication Data
US 2018/0275743 A1    Sep. 27, 2018

Related U.S. Application Data

(63) Continuation of application No. 13/728,824, filed on Dec. 27, 2012, now Pat. No. 9,939,883.

(51) Int. Cl.
*G06F 1/32* (2019.01)
*G06F 1/3296* (2019.01)
*G06F 1/3228* (2019.01)

(52) U.S. Cl.
CPC ......... *G06F 1/3296* (2013.01); *G06F 1/3228* (2013.01); *Y02D 10/172* (2018.01); *Y02D 50/20* (2018.01)

(58) Field of Classification Search
None
See application file for complete search history.

(56) References Cited

U.S. PATENT DOCUMENTS

| 4,958,269 A | 9/1990 | Gritter |
| 5,272,649 A | 12/1993 | Campbell et al. |
| 5,275,919 A | 1/1994 | Kawatsuji et al. |
| 5,542,240 A | 8/1996 | Snider et al. |
| 5,690,139 A | 11/1997 | Murphy et al. |

(Continued)

FOREIGN PATENT DOCUMENTS

| DE | 102011102238 | 12/2011 |
| GB | 2481492 | 12/2011 |

OTHER PUBLICATIONS

Park, Junyoung et al., "A Fast, Accurate and Simple Critical Path Monitor for Improving Energy-Delay Product in DVS Systems," IEEE/ACM 2011 International Symposium on Low Power Electronics and Design, Aug. 1, 2011, pp. 391-396.

(Continued)

*Primary Examiner* — Paul B Yanchus, III (57) ABSTRACT

One embodiment provides a method for reducing leakage current in device logic having an operational supply-voltage threshold, a nonzero data-retention supply voltage threshold, and two or more on-die transistor switches to switchably connect a voltage source to the device logic. After the logic enters an idle period, one or more of the switches are opened to lower a supply voltage of the logic below the operational supply-voltage threshold but above the data-retention supply-voltage threshold. When the logic exits the idle period, one or more of the switches are closed to raise the supply voltage of the logic above the operational supply-voltage threshold.

18 Claims, 6 Drawing Sheets

(56) References Cited

U.S. PATENT DOCUMENTS

| | | |
|---|---|---|
| 5,691,662 A | 11/1997 | Soboleski et al. |
| 5,760,636 A | 6/1998 | Noble et al. |
| 5,787,006 A | 7/1998 | Chevallier et al. |
| 5,889,529 A | 3/1999 | Jones et al. |
| 6,080,206 A | 6/2000 | Tadokoro et al. |
| 6,111,756 A | 8/2000 | Moresco |
| 6,157,247 A | 12/2000 | Abdesselem et al. |
| 6,198,635 B1 | 3/2001 | Shenoy et al. |
| 6,272,649 B1 | 8/2001 | Hayward et al. |
| 6,275,919 B1 | 8/2001 | Johnson |
| 6,397,375 B1 | 5/2002 | Block et al. |
| 6,535,071 B2 | 3/2003 | Forbes |
| 6,549,240 B1 | 4/2003 | Reitmeier |
| 6,690,139 B1 | 2/2004 | Seibel |
| 6,734,744 B2 | 5/2004 | Monzel et al. |
| 6,831,494 B1 | 12/2004 | Fu et al. |
| 6,882,172 B1 | 4/2005 | Suzuki et al. |
| 6,885,210 B1 | 4/2005 | Suzuki |
| 6,898,770 B2 | 5/2005 | Boluki et al. |
| 6,903,564 B1 | 6/2005 | Suzuki |
| 6,985,025 B1 | 1/2006 | Maksimovic et al. |
| 7,024,568 B2 | 4/2006 | Maksimovic et al. |
| 7,038,483 B1 | 5/2006 | Suzuki et al. |
| 7,061,292 B2 | 6/2006 | Maksimovic et al. |
| 7,080,271 B2 | 7/2006 | Kardach et al. |
| 7,085,658 B2 | 8/2006 | Bhushan et al. |
| 7,095,288 B2 | 8/2006 | Smith |
| 7,107,200 B1 | 9/2006 | Korobkov |
| 7,126,365 B2 | 10/2006 | Suzuki |
| 7,129,763 B1 | 10/2006 | Bennett et al. |
| 7,145,383 B2 | 12/2006 | Mizuno |
| 7,149,903 B1 | 12/2006 | Chan et al. |
| 7,151,417 B1 | 12/2006 | Suzuki |
| 7,161,812 B1 | 1/2007 | Thomas |
| 7,212,022 B2 | 5/2007 | Suzuki |
| 7,235,998 B1 | 6/2007 | Suzuki |
| 7,281,232 B1 | 10/2007 | Nicolino, Jr. et al. |
| 7,315,178 B1 | 1/2008 | Suzuki |
| 7,330,080 B1 | 2/2008 | Stoiber et al. |
| 7,414,485 B1 | 8/2008 | Masleid |
| 7,417,482 B2 | 8/2008 | Elgebaly et al. |
| 7,454,735 B2 | 11/2008 | Arthanari et al. |
| 7,456,628 B2 | 11/2008 | Suzuki |
| 7,467,367 B1 | 12/2008 | Li et al. |
| 7,501,868 B2 | 3/2009 | Ito |
| 7,574,613 B2 | 8/2009 | Holle et al. |
| 7,627,730 B1 | 12/2009 | Moll |
| 7,636,023 B1 | 12/2009 | Suzuki |
| 7,642,866 B1 | 1/2010 | Masleid |
| 7,667,478 B2 | 2/2010 | Suzuki |
| 7,739,531 B1 | 6/2010 | Krishnan |
| 7,768,356 B2 | 8/2010 | Masleid |
| 7,774,732 B2 | 8/2010 | KleinOsowski et al. |
| 7,839,410 B1 | 11/2010 | Brown et al. |
| 7,868,638 B2 | 1/2011 | Suzuki |
| 7,889,014 B1 | 2/2011 | Stoiber et al. |
| 8,008,961 B2 | 8/2011 | Garg et al. |
| 8,055,871 B1 | 11/2011 | Schulze et al. |
| 8,125,261 B2 | 2/2012 | Nomura |
| 8,134,356 B2 | 3/2012 | Dobberpuhl et al. |
| 8,193,798 B1 | 6/2012 | Pace et al. |
| 8,370,663 B2 | 2/2013 | Frid et al. |
| 8,593,197 B1 | 11/2013 | Cheng |
| 8,624,680 B2 | 1/2014 | Stoiber et al. |
| 8,656,198 B2 | 2/2014 | Branover et al. |
| 8,775,843 B2 | 7/2014 | Frid |
| 8,949,645 B2 | 2/2015 | Ahmad et al. |
| 9,939,883 B2 * | 4/2018 | Swarna ............... G06F 1/3296 |
| 2002/0024828 A1 | 2/2002 | Hayashi et al. |
| 2002/0126751 A1 | 9/2002 | Scheurich et al. |
| 2002/0188920 A1 | 12/2002 | Lampaert et al. |
| 2003/0004921 A1 | 1/2003 | Schroeder |
| 2003/0030483 A1 | 2/2003 | Seki et al. |
| 2003/0156639 A1 | 8/2003 | Liang |
| 2004/0010330 A1 | 1/2004 | Chen |
| 2004/0057324 A1 | 3/2004 | Abe et al. |
| 2004/0078773 A1 | 4/2004 | Sharma et al. |
| 2004/0123171 A1 | 6/2004 | Zhang et al. |
| 2005/0012556 A1 | 1/2005 | Bhushan et al. |
| 2005/0021656 A1 | 1/2005 | Callegari |
| 2005/0024155 A1 | 2/2005 | Huang |
| 2005/0036246 A1 | 2/2005 | Nagata et al. |
| 2005/0057314 A1 | 3/2005 | Hsu et al. |
| 2005/0057551 A1 | 3/2005 | Gong et al. |
| 2005/0097497 A1 | 5/2005 | Schlansker et al. |
| 2005/0218943 A1 | 10/2005 | Padhye et al. |
| 2005/0271361 A1 | 12/2005 | Aoki et al. |
| 2006/0031699 A1 | 2/2006 | Arthanari et al. |
| 2006/0097795 A1 | 5/2006 | Sohn |
| 2006/0143484 A1 | 6/2006 | Samson et al. |
| 2006/0156266 A1 | 7/2006 | Alpert et al. |
| 2006/0246895 A1 | 11/2006 | Ryu |
| 2006/0284657 A1 | 12/2006 | Park et al. |
| 2006/0288323 A1 | 12/2006 | Birch |
| 2007/0001697 A1 | 1/2007 | Dobberpuhl et al. |
| 2007/0157144 A1 | 7/2007 | Mai et al. |
| 2007/0165343 A1 | 7/2007 | Barowski et al. |
| 2007/0206018 A1 | 9/2007 | Bajic et al. |
| 2007/0220289 A1 | 9/2007 | Holle et al. |
| 2007/0234088 A1 | 10/2007 | Marshall et al. |
| 2008/0204158 A1 | 8/2008 | Weder |
| 2008/0244280 A1 | 10/2008 | Hutchison |
| 2008/0307240 A1 | 12/2008 | Dahan |
| 2008/0307244 A1 | 12/2008 | Bertelsen et al. |
| 2009/0077402 A1 | 3/2009 | Huang et al. |
| 2009/0204830 A1 | 8/2009 | Frid et al. |
| 2009/0271752 A1 | 10/2009 | Alpert et al. |
| 2010/0019818 A1 | 1/2010 | Priel et al. |
| 2010/0019834 A1 | 1/2010 | Zerbe et al. |
| 2010/0077243 A1 | 3/2010 | Wang et al. |
| 2010/0095137 A1 | 4/2010 | Bieswanger et al. |
| 2010/0182055 A1 | 7/2010 | Rozen et al. |
| 2010/0231044 A1 | 9/2010 | Tatsumi et al. |
| 2010/0231306 A1 | 9/2010 | Goodnow et al. |
| 2010/0250972 A1 | 9/2010 | Freitas |
| 2010/0318828 A1 | 12/2010 | Elting et al. |
| 2011/0032008 A1 | 2/2011 | Zhao et al. |
| 2011/0110000 A1 | 5/2011 | Etter |
| 2011/0161901 A1 | 6/2011 | Berry et al. |
| 2011/0181325 A1 | 7/2011 | May et al. |
| 2011/0199159 A1 | 8/2011 | Rozen et al. |
| 2011/0205680 A1 | 8/2011 | Kidd et al. |
| 2011/0314314 A1 | 12/2011 | Sengupta |
| 2011/0320839 A1 | 12/2011 | David et al. |
| 2012/0013408 A1 | 1/2012 | Cortadella et al. |
| 2012/0042176 A1 | 2/2012 | Kim |
| 2012/0054519 A1 | 3/2012 | Branover et al. |
| 2012/0062308 A1 | 3/2012 | Chakrabarty |
| 2012/0105452 A1 | 5/2012 | Diard |
| 2012/0110351 A1 | 5/2012 | Raju et al. |
| 2012/0188233 A1 | 7/2012 | Shuster et al. |
| 2012/0223940 A1 | 9/2012 | Dunstan et al. |
| 2012/0306877 A1 | 12/2012 | Rosasco |
| 2013/0002838 A1 | 1/2013 | Takenaka |
| 2013/0035797 A1 | 2/2013 | Allen-Ware et al. |
| 2013/0097443 A1 | 4/2013 | Li et al. |
| 2013/0152035 A1 | 6/2013 | Berry et al. |
| 2013/0158892 A1 | 6/2013 | Heron et al. |
| 2013/0179711 A1 | 7/2013 | Aelion et al. |
| 2013/0212417 A1 | 8/2013 | Frid et al. |
| 2013/0311799 A1 | 11/2013 | Fitzpatrick et al. |
| 2014/0032947 A1 | 1/2014 | Ahmad et al. |
| 2014/0043333 A1 | 2/2014 | Narayanan et al. |
| 2014/0184626 A1 | 7/2014 | Narayanan et al. |
| 2014/0266460 A1 | 9/2014 | Nobbe et al. |
| 2015/0022272 A1 | 1/2015 | Felix et al. |
| 2015/0049519 A1 | 2/2015 | Izadian |
| 2016/0380619 A1 | 12/2016 | Bollapalli et al. |

(56) References Cited

U.S. PATENT DOCUMENTS

OTHER PUBLICATIONS

Stiles, Jim, "10.3 CMOS Logic Gate Circuits," The University of Kansas, Dept. of EECS, retrieved from http://www.ittc.ku.edu/~jstiles/312/handouts/section_10_3_CMOS_Logic_Gate_Circuits_package.pdf, Nov. 14, 2004, 22 pages.

Verma, Naveen, "Analysis Toward Minimization of Total SRAM Energy Over Active and Idle Operating Modes," IEEE Transactions on Very Large Scale Integration (VLSI) Systems, vol. 19, Issue No. 9, Sep. 2011, pp. 1695-1703.

Zhang, Kevin et al., "Low-Power SRAMs in Nanoscale CMOS Technologies," IEEE Transactions on Electron Devices, vol. 55, Issue No. 1, Jan. 2008, pp. 145-151.

\* cited by examiner

SUPPLY-VOLTAGE CONTROL FOR DEVICE POWER MANAGEMENT

CROSS-REFERENCE TO RELATED APPLICATIONS

This is a continuation of U.S. patent application Ser. No. 13/728,824 filed Dec. 27, 2012, which is incorporated herein in its entirety.

BACKGROUND OF THE INVENTION

An electronic device may enact a power-management scheme to reduce power consumption, limit heat dissipation, extend battery life, etc. One aspect of the power management scheme may target so-called 'leakage currents' in the device-relatively small currents that flow through a component of the device when that component is idle. To this end, the device may include a power-management unit (PMU) configured to detect an idle condition of one or more device components. After the idle condition is detected, the logic state of the idle component may be saved, and the supply voltage to that component disconnected. In that manner, the leakage current that would otherwise be drawn through the component is greatly reduced. After a period of time, the PMU may detect a request to resume operation of the unpowered component. At that point, the supply voltage to the component is restored, and the logic state of the component is recovered.

The power-management scheme summarized above is more useful for some devices and usage scenarios than for others. The feature that limits its utility is the need to save the logic state of the idle component every time the idle condition is detected, and to recover the logic state every time the component is returned to operation. In general, each save and recovery operation requires time, processing power, and energy. Accordingly, the above scheme is most applicable in scenarios in which the idle condition is relatively infrequent and relatively long-lived. If more frequent save and restore operations are required, the overall performance of the device may suffer, and the potential power savings may be eroded.

DETAILED DESCRIPTION OF THE INVENTION

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

Figure 1:
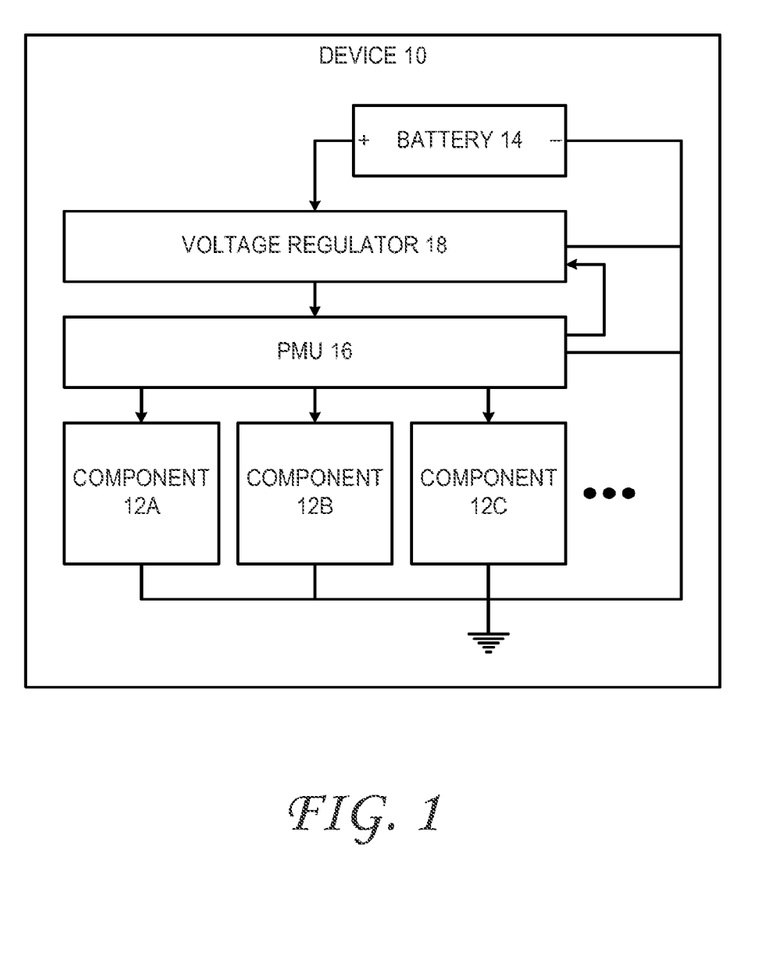
FIG. 1 schematically shows aspects of an example electronic device in accordance with an embodiment of this disclosure.

FIG. 1 schematically shows aspects of an example electronic device 10 in one embodiment. The device may be a cellular telephone, a computer, a handheld media player, or game system, for example. The device of FIG. 1 includes components 12A, 12B, and 12C. More generally, the device may include any number of components 12. The terms 'component', 'device component', 'logic-device component', 'logic', 'logic structure', and 'device logic' are used herein to indicate a powered substructure of the device. The components of device 10 may include a central processing unit (CPU), a graphics processing unit (GPU), or a system-on-a-chip (SOC), for example. In the embodiments considered herein, at least one of the components may be configured for volatile data storage—i.e., data is stored in some form of electronic memory that requires at least some power to retain the data state. In the embodiment of FIG. 1, such power is derived from battery 14. Although only one battery is shown in the drawing, the device may include any number of batteries. In other embodiments, the battery may be replaced by any other suitable power source, such as a plug-in power supply or solar cell, for example. Power from the battery or other power source is distributed to the various components of the device via PMU 16. An appropriate load-regulated voltage (e.g. +3.3 VDC) is supplied to the PMU from voltage regulator 18.

No aspect of FIG. 1 should be understood in a limiting sense, for numerous other embodiments are contemplated as well. For instance, device 10 may include more than one voltage regulator, to supply more than one regulated voltage to components 12. The one or more voltage regulators may be on- or off-die.

Device 10 and the components therein may be subject to intermittent usage. During periods of disuse, the logic structures of one or more of the components may be idle—i.e., performing no operation. If a component remains powered during an idle condition, logic structures within that component may continue to draw a relatively small 'leakage current' proportional to the voltage supplied to the component. Over time, the amount of energy lost to the leakage current may be significant. Therefore, PMU 16 may be configured to enact a power-management scheme in which the power supply to idle components is suspended. This strategy may help to reduce power consumption, limit heat dissipation, extend battery life, etc.

In some cases, the logic structures of a component may define a logic state that must be preserved during the idle period, so that the desired functionality can resume when the component is restored to operation. Such logic states may include the content of register files, data and instruction caches, and/or bit flags, for example. If the logic state stored in the component is volatile, then PMU 16 must save the state elsewhere—e.g., in non-volatile storage-before suspending power to the component. In addition, when the component is restored to operation, the saved logic state must be recovered—i.e., written back into the component so that the desired functionality may resume.

Figures 2, 3:
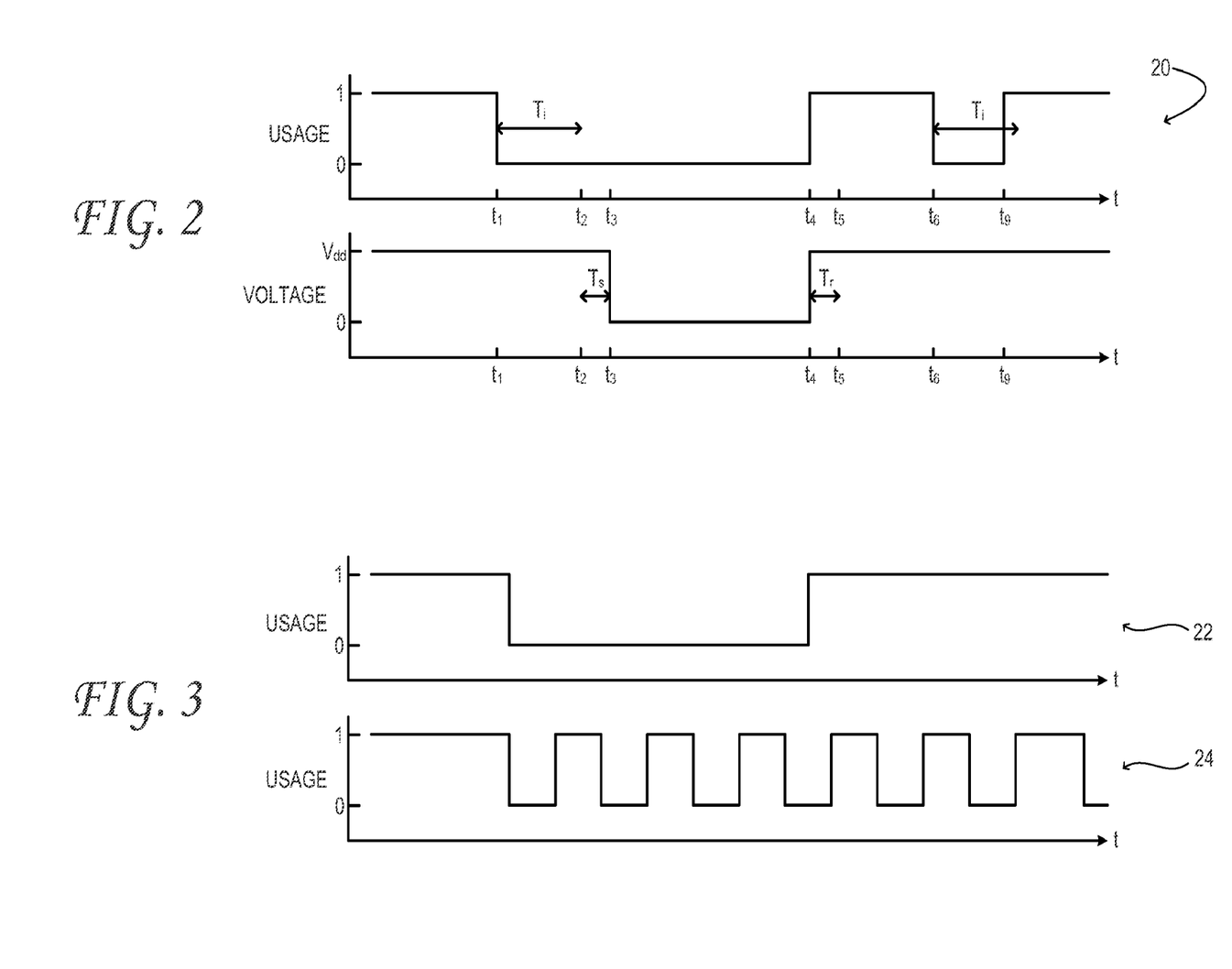
FIG. 2 shows aspects of a data-state recovering power-management scheme in accordance with an embodiment of this disclosure.
FIG. 3 is a comparison of two different usage scenarios of a logic-device component in accordance with an embodiment of this disclosure.

FIG. 2 shows, by way of example, aspects of a data-state recovering PM scheme 20, which PMU 16 may be configured to enact. The upper graph represents component usage versus time in one example scenario; it shares the same time axis as the lower graph, which represents supply voltage versus time. The particular supply voltage represented in FIG. 2 is a drain supply voltage ($V_{dd}$), which could be distributed from a positive supply rail to microstructures of a complementary metal-oxide semiconductor (CMOS) circuit. However, the approaches set forth herein are equally applicable to other supply voltages, those distributed from a negative supply rail, and to microstructures of other logic families. For ease of illustration, the drawings herein represent component usage as a binary value-one if the component is in use, zero if it is idle. The reader will understand, however, that component usage can be quantified in other ways too—e.g., as a continuous function.

At $t_1$ FIG. 2, PMU 16 detects that the component usage has dropped to zero, indicating that the component has entered an idle period. At this point, the PMU begins clocking an idle timer for that component. At $t_2$ the PMU determines that the period of component inactivity has exceeded a predetermined inactivity threshold $T_i$. The inactivity threshold $T_i$ defines how far into the idle period the normal PMU operation should continue before the supply voltage is cut off. In some embodiments, $T_i$ may be adjusted according to one or more heuristics, as described hereinafter.

At the point where the inactivity threshold $T_i$ is reached, PMU 16 begins saving the logic state of the component, which is completed at $t_3$, at the end of the $T_s$ interval. Once the logic state is saved, the component may be powered down; accordingly, the supply voltage is reduced to zero at $t_3$. More precisely, either or both of the virtual supply voltage to the component or the actual supply voltage of the voltage regulator, may be reduced to zero.

In the scenario of FIG. 2, the component remains idle until $t_4$. From $t_3$ $t_4$, the supply voltage is maintained at zero, thus no leakage current flows through the component. At $t_4$ PMU 16 detects a request for a function or service in device 10 that requires the idle component to operate. This condition triggers an exit from the idle period. Accordingly, the PMU restores the normal supply voltage ($V_{dd}$) to the component. As soon as the supply voltage is restored, the PMU recovers the logic state of the component; this process is completed at $t_5$, at the end of the $T_r$ interval. In one approach, the length of the $T_i$ threshold is set to a desired value in firmware and/or software running on the device. The desired value of $T_i$ may be determined empirically, based in part on the combined lengths of the $T_s$ and $T_r$ intervals. In essence, the combined lengths of the $T_s$ and $T_r$ intervals may be used to establish the rough timescale for the threshold, which can be modified according to a heuristic or statistical function. In this manner, the $T_i$ threshold may be optimized to reduce power consumption, to improve performance, or to strike a desirable balance between the two.

Continuing in FIG. 2, at $t_6$ the component usage again drops to zero, and the PMU again begins clocking the idle timer. This time, however, the usage does not remain at zero for the entire $T_i$ interval, because another function or service request is received at $t_9$. Accordingly, the PMU does not save the logic state of the component or power down the component, and leakage current continues to flow from $t_6$ to $t_9$.

As shown in the example above, scheme 20 is most useful in cases where the component is powered down relatively infrequently and stays unpowered for a relatively long time before powering hack up. Fundamentally, this is due to the nonnegligible processing-time and energy requirement to save and recover the logic state, which is reflected in the $T_i$ threshold. A usage scenario in which scheme 20 may be acceptable is represented in graph 22 of FIG. 3. Graph 24 of the same figure shows an alternative usage scenario that includes the same amount of idle and operational time. In the latter scenario, however, none of the idle periods are long enough to exceed the $T_i$ threshold, so the supply voltage remains at $V_{dd}$, and the leakage current continues to flow.

To address this issue, PMU 16 may be configured to enact a data-state preserving PM scheme 26 instead of, or in addition to, data-state recovering PM scheme 20. In the data-state preserving PM scheme, the supply voltage to the idle component is not disconnected, but merely reduced to a lower value after the component enters an idle period. This lower value may be less than $V_O$, the operational supply-voltage threshold for maintaining operation in the component, but greater than $V_R$, the nonzero data-retention supply-voltage threshold for retaining the logic state (e.g., data) in the component. In this manner, the leakage current through the logic structures of the idle component is not eliminated. It is reduced, however, to a much lower value than would flow if the supply voltage were maintained above $V_O$.

Figure 4:
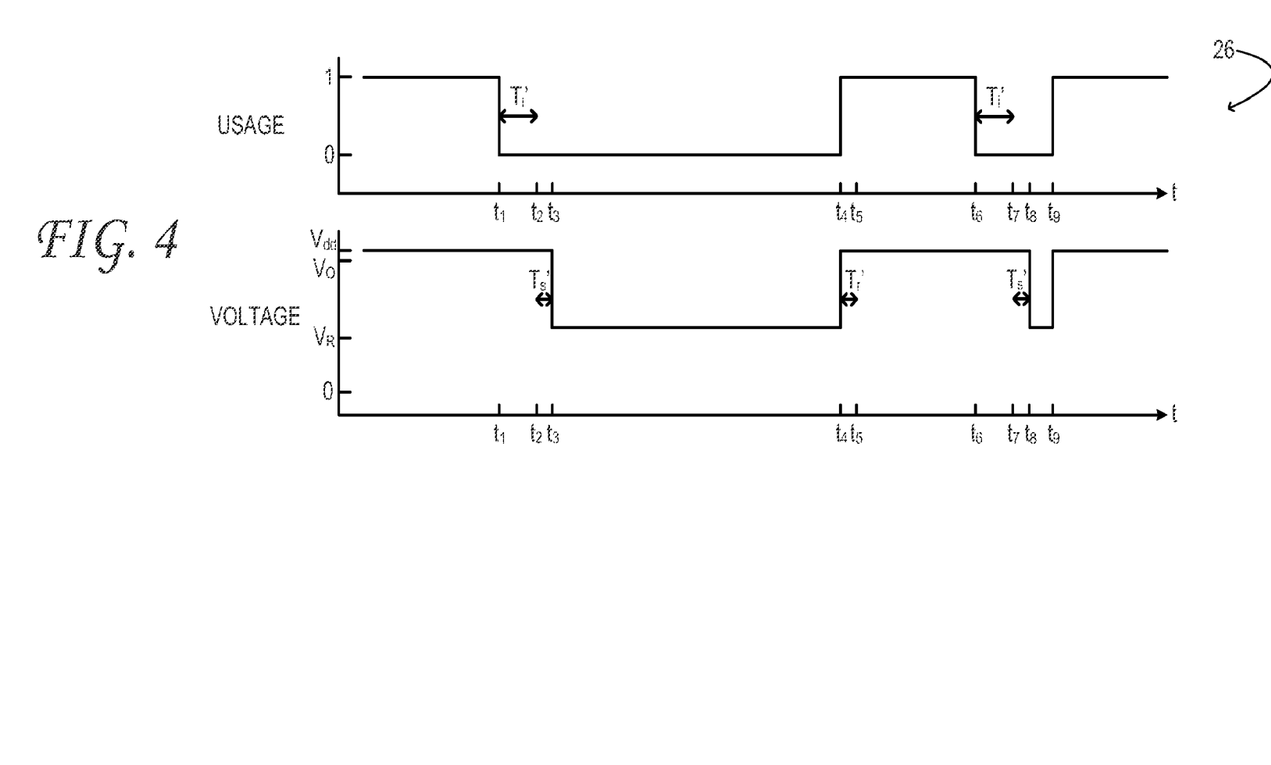
FIG. 4 shows aspects of a data-state preserving power-management scheme in accordance with an embodiment of this disclosure.

The primary advantage of this approach is that it is not necessary to save the logic state of the idle component before reducing the supply voltage, nor to recover the logic state after returning the supply voltage to its operational value. As a result, a reduced inactivity threshold $T'_i$ may be used to determine when to reduce the supply voltage. The reduced inactivity threshold may be based on $T'_s$, the time interval required to lower the supply voltage, and $T'_r$, the time interval required to restore the supply voltage to $V_{dd}$, and modified according to a heuristic or statistical function. In the embodiments envisaged herein, $T'_s$ may be much less than $T_s$, and $T'_r$ may be much less than $T_r$, resulting in a significantly reduced $T'_i$. The graphs of FIG. 4 illustrate this approach for the same usage scenario considered in FIG. 2.

It will be noted that the reduced inactivity threshold may be calculated in any suitable manner. Some approaches may incorporate machine learning to arrive at a reduced inactivity threshold where power savings are forecast statistically for a predetermined subset of supply voltage reduction events. In this manner, power savings may be realized 50 percent of the time that the supply voltage is reduced, in one non-limiting example.

The balance of this disclosure provides more detail on how the data-state preserving PM scheme may be enacted. Various embodiments are envisaged. In one embodiment, PMU 16 may be configured to cause, the set-point voltage of voltage regulator 18 to be reduced, after a component of the device becomes idle, to a value greater than $V_R$ but less than $V_O$. When the PMU detects a request for a function or service of the component, it may restore the set-point voltage of the voltage regulator to above $V_O$ (e.g., back to $V_{dd}$). In this embodiment, $T'_s$ may be the time it takes for the output of the voltage regulator to converge onto the reduced value following the reduction in the set-point, and $T'_r$ may be the time it takes for the output to converge back to $V_{dd}$; $T'_s \sim T'_r \sim 10$ to 50 μs, in one non-limiting example.

Some factors, however, may limit the use of a PM scheme that changes the set-point of a voltage regulator. For example, in a computing system with multiple processors, in which several cores may share the same power rail, the supply voltage cannot be reduced below $V_O$ (or even below $V_{dd}$) if one or more cores are executing instructions. A similar issue arises for a processor with multiple domains and independent power gating. Furthermore, some voltage regulators may require hundreds of microseconds to arrive stably at a new set-point voltage. As noted above, the savings of lowering the supply voltage will be available only during idle periods that are longer than the latency of the voltage change.

Figure 5:
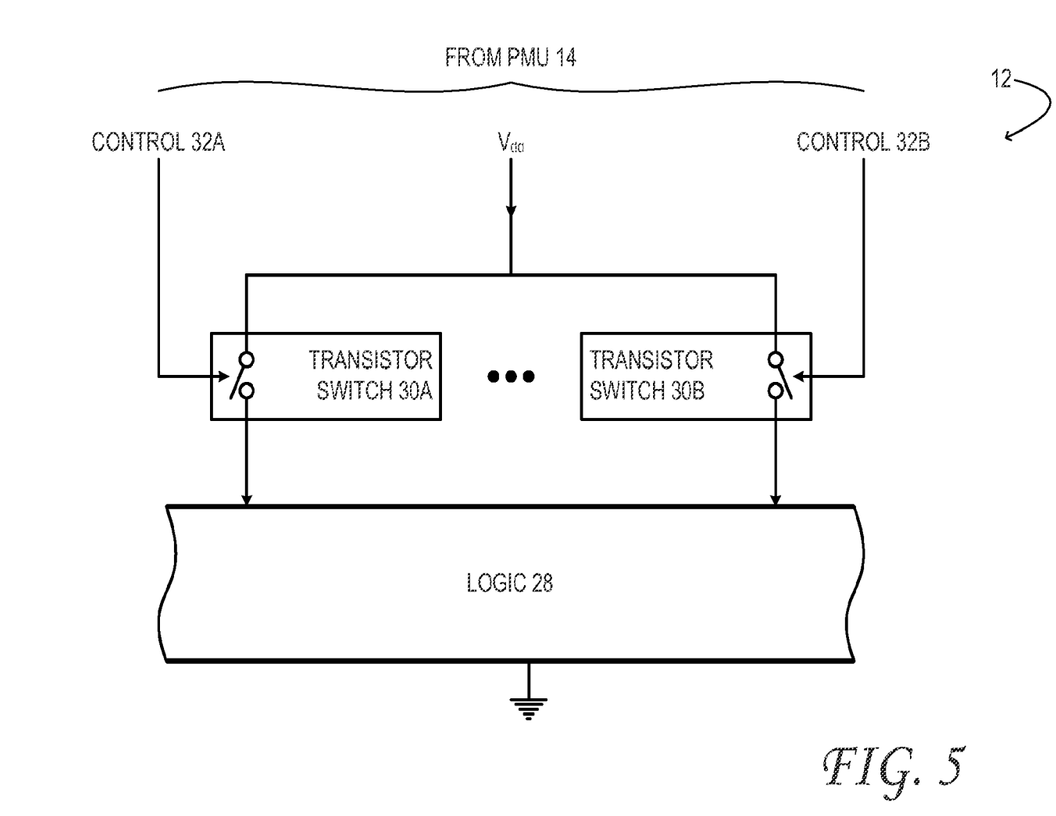
FIGS. 5 and 6 show aspects of a logic-device component in accordance with embodiments of this disclosure.

In another embodiments, therefore, a data-state preserving PM scheme may be enacted via selective opening and closing of various transistor switches arranged in a device component. FIG. 5 shows component 12 in greater detail. In the illustrated embodiment, the supply voltage is provided to logic structure 28 through a plurality of transistor switches 30, which are arranged in parallel, each switch having a gate terminal to control whether the switch is open or closed. In one embodiment, the transistor switches may include field-effect transistors. In the embodiment of FIG. 5, the transistor switches switchably connect the logic structure to the voltage supply line. Although only two transistor switches are shown in the drawing, this disclosure is consistent with the use of any number of transistor switches.

PMU 16 may be configured to actuate each of the transistor switches through corresponding control lines 32, which are connected to the gate terminals of the transistor switches. Each transistor switch has a nonzero ON resistance, through which a current flows to power the logic structure, and an OFF resistance, which is effectively infinite. Accordingly, the parallel ensemble of transistor switches will have a resistance controlled by the number and width of the transistor switches held in the ON state. The voltage drop across the parallel ensemble of transistor switches may therefore be controlled by the PMU. In one embodiment, the PMU may be configured so that after the component becomes idle, it opens as many transistor switches as needed to drop the voltage supplied to the logic structure to a value greater than $V_R$ but less than $V_0$. In other words, the PMU may be configured to open one or more of the switches to lower a voltage supplied to the logic component after the component enters an idle period, but to maintain the voltage above the data-retention supply-voltage threshold; in doing so, the PMU may lower the voltage supplied to the logic below the operational supply voltage threshold. The PMU may be further configured to close one more of the switches to raise the voltage above the operational supply-voltage threshold when the component exits the idle period. More particularly, when a request for a function or service of the component is received, the PMU may close as many transistor switches as necessary to restore the supply voltage to $V_{dd}$. Accordingly, the PMU may be further configured to detect entry into the idle period and exit from the idle period.

PMU 16, or another device component, may determine a number of transistor switches to open or close. In some embodiments, the PMU may close all transistor switches so as minimize the resistance between a power supply and the component. In this way, lowering and raising the supply voltage provided to a logic-device component may be enacted by respectively opening and closing one or more transistor switches switchably connected to the logic-device component.

Figure 6:
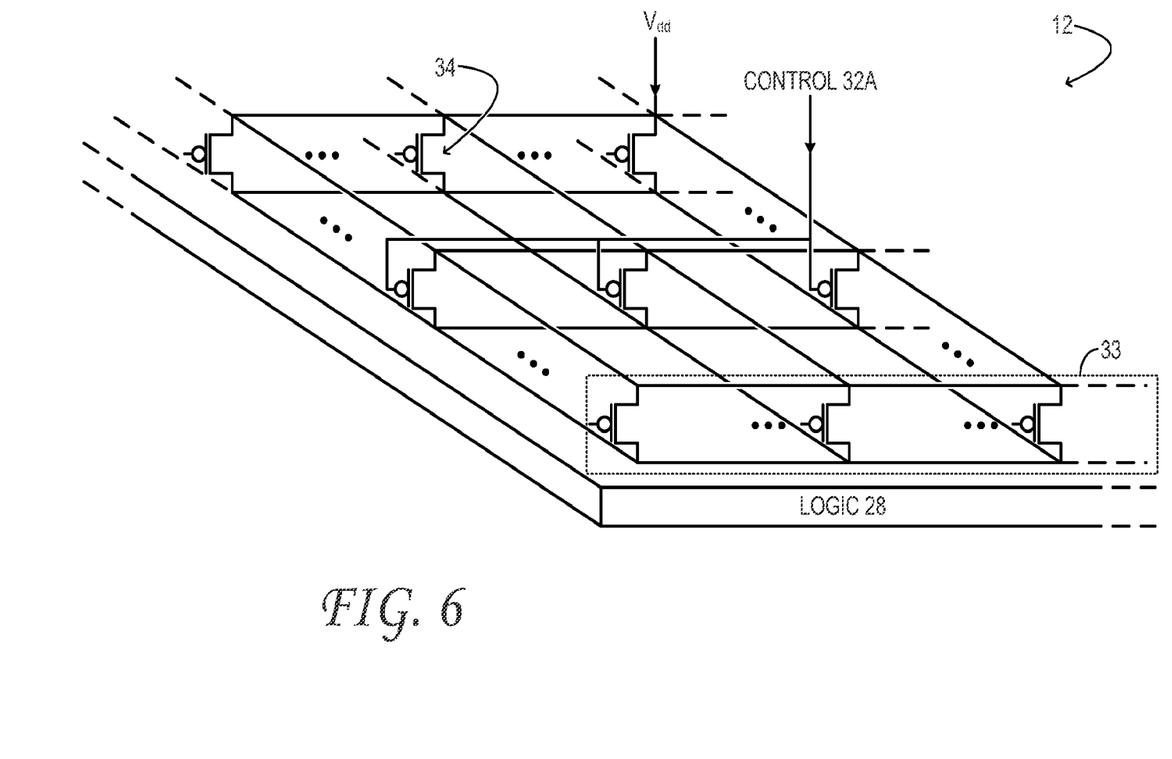

FIG. 6 shows aspects of a more particular device component 12 configured to support the data-state preserving PM scheme through selective opening and closing of the transistor switches arranged in that component. In the embodiment of FIG. 6, the transistor switches take the form of an array of power-gating (PG) headers 34, which are spatially distributed over the various logic structures 28 of the component. In the embodiment illustrated in FIG. 6, each PG header comprises a metal-oxide semiconductor field-effect transistor (MOSFET).

As shown in FIG. 6, the same control line (e.g., control line 32A) may be connected to the gate terminals of a plurality of PG headers, thereby defining a commonly actuated PG zone (e.g., PG zone 33). In some embodiments, each PG zone supplies power to the nearest region of the logic. In this manner, the entire array of PG headers may be grouped into a smaller number of PG zones. In the example embodiment, zones are arranged in a regular, two-dimensional array. Such an arrangement may be appropriate for two-dimensional logic-devices, though virtually any spatial arrangement is possible and may be tailored to the geometry and requirements of a particular logic-device. Grouping the PG headers together in zones enables them to be turned on and off in a manageable, controlled manner. When all the PG zones are turned on, the supply voltage to logic structure 28 will approach $V_{dd}$. Such embodiments may improve logic-device packaging sizes, reduce manufacturing complexity, and minimize the lengths of the control lines that might otherwise extend from a controller to a distant logic structure.

In some embodiments, when addressing two or more PG zones in sequence, each PG zone may be addressed followed by a short time lapse to allow the supply voltage to settle to an intermediate value between $V_0$ and $V_R$. In still other embodiments, all zones may be turned on when the logic resumes activity. In this manner, the resistance between the power supply and the voltage supply line is minimized. When some of the PG zones are turned off, a reduced supply voltage may be provided to the logic structure-viz., to reduce the leakage current when component 12 is idle.

In some embodiments, it may be beneficial to uniformly distribute the PG headers left on at idle so as to provide a spatially homogeneous, reduced-voltage distribution in the underlying logic structure. This aspect can be enacted, in one embodiment, by grouping the headers into localized zones (e.g., PG zone 33 shown in FIG. 6), and homogeneously distributing the zones that remain on during idle. In a different embodiment, each PG zone may comprise PG headers distributed spatially within the array, such that each zone provides a homogeneous voltage distribution. Virtually any number of PG headers may be included in a zone without departing from the scope of the present invention. Further, one or more zones may comprise the same number of PG headers, or they may comprise unequal numbers of PG headers. Resistance of a zone will vary with the number of PG headers that are included, which may be exploited to improve performance and/or power savings.

The configurations described above enable various methods for reducing leakage current in a logic-device component. Accordingly, some methods are now described, by way of example, with continued reference to the above configurations. It will be understood, however, that the methods here described, and others fully within the scope of this disclosure, may be enabled by other configurations as well. Naturally, each execution of a method may change the entry conditions for a subsequent execution and thereby invoke a complex decision-making logic. Such logic is fully contemplated in this disclosure. Some of the process steps described and/or illustrated herein may, in some embodiments, be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Figure 7:
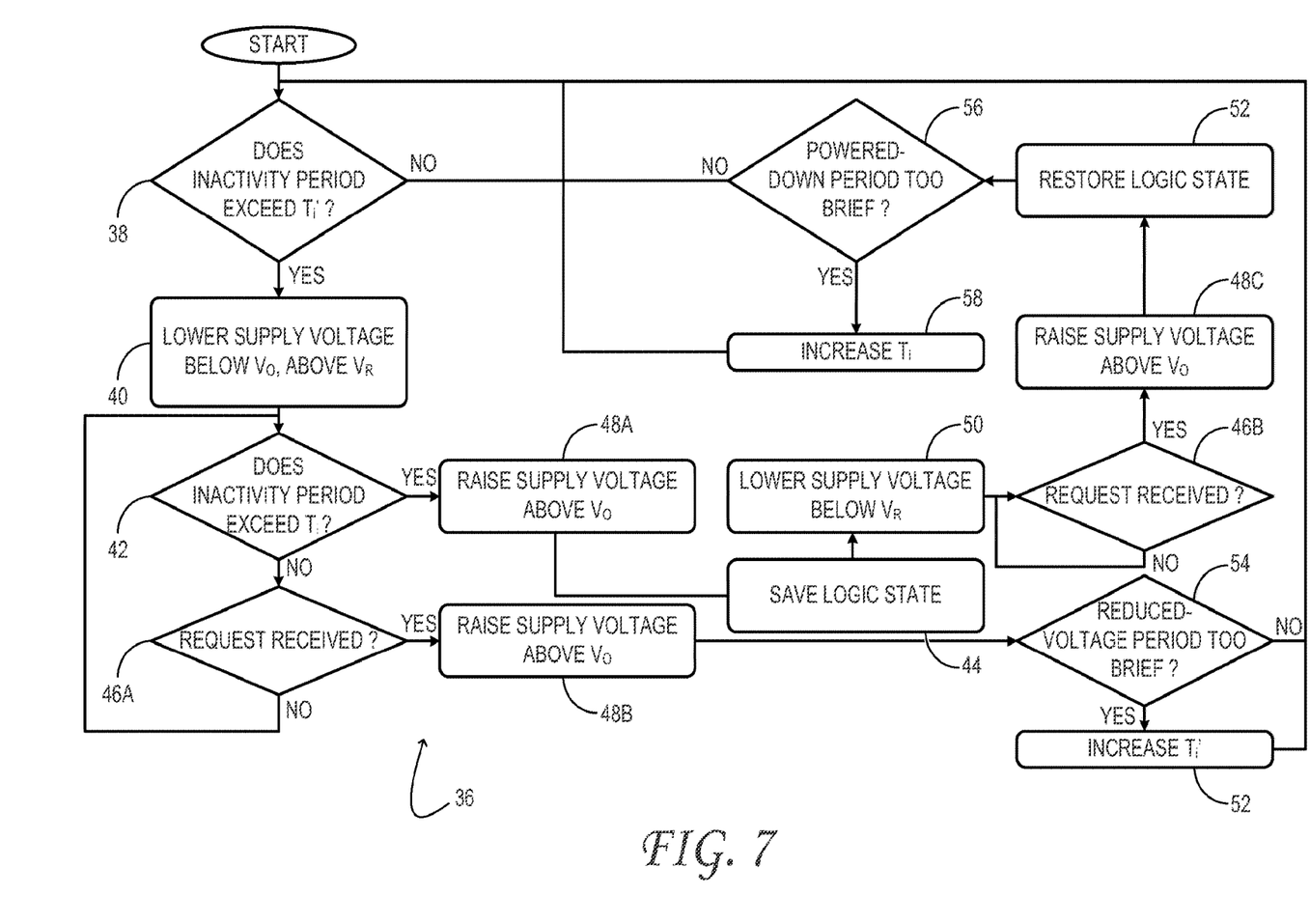
FIG. 7 illustrates an example method for reducing leakage current in a logic device component in accordance with an embodiment of this disclosure.

FIG. 7 illustrates an example method 36 for reducing leakage current in a logic device component. In this method, the component's entry into an idle period is detected, and when that component remains inactive longer than a predetermined inactivity threshold, appropriate power-saving actions are taken. Accordingly, at 38 of method 36, it is determined whether a period of inactivity of the component exceeds an inactivity threshold $T'_i$. If the period of inactivity exceeds $T'_i$, then the method advances to 40. At 40 the supply voltage to the component is lowered below the operational supply-voltage threshold $V_O$, but above the data-retention supply-voltage threshold $V_R$. Effectively, the inactivity threshold defines how far into the idle period to lower the supply voltage.

Method 36 then advances to 42. At 42 it is determined whether the period of inactivity of the component exceeds a longer inactivity threshold $T_i$. This is the threshold used to determine whether to completely power down the component. If the inactivity period exceeds the longer inactivity threshold, then the method advances to 48A, where the supply voltage is raised above $V_O$ to permit saving of the data state at 44. However if the period does not exceed the longer inactivity threshold, then the method advances to 46A, where it is determined whether a request for a function or service of the idle component is received. In the illustrated method, the component's exit from the idle period is detected when such a request is received. Accordingly, if the request is received at 46A, then the method advances to 48B, where the supply voltage is raised above $V_O$. Thus, the supply voltage to the component is raised above the operational supply-voltage threshold when the component exits the idle period. If no such request is received, then the method returns to 42.

At 44 of method 36, when it has been determined that the inactivity period has exceeded the longer inactivity threshold, the logic state of the idle component is saved. At 50, after saving the logic state, the supply voltage to the component is lowered below $V_R$—or effectively powered down completely. From this point, the method advances to 46B, where it is again determined whether a request for a function or service of the idle component has been received. If such a request is received, then the method advances to 48C, where the supply voltage to the component is raised above $V_O$. Here again, when the component exits the idle period, the supply voltage of the component is raised above the operational supply-voltage threshold. This action is followed by restoration of the logic state of the component, at 52.

In one embodiment, raising and lowering the supply voltage in the context of method 36 may include raising and lowering a setpoint of a voltage regulator by a PMU of the logic device. In another embodiment, the raising and lowering may be enacted by closing and opening, respectively, one or more transistor switches. As described hereinabove, the transistor switches may be arranged in parallel, switchably connecting the logic structure of the component to a voltage source. Further, the switches may be actuated by a PMU of the logic device. In a more particular embodiment, the opening and closing the one or more transistor switches may include addressing the transistor switches in two or more groups (e.g., PG zone 33) that share a common control line. This may be done in such a way that the groups of closed switches are distributed uniformly over the logic structure, to prevent undesirable supply-voltage gradients. Moreover, the two or more groups may be addressed in sequence, separated by a settling period during which the supply voltage is allowed to settle before advancing to a lower or higher value. In some embodiments, the method may further include a determination of a number of the desired number of transistor switches to open or close, in order to provide the desired supply voltage to the logic structure.

At 54 of method 36, it is determined whether the period of reduced supply voltage was too brief, in the sense that the savings in leakage current afforded no advantage in view of the time and or energy required to drop the supply voltage to a stable level and raise it back to $V_{dd}$. If the period of reduced supply voltage was in fact too brief, then the method advances to 52, where the $T'_i$ interval is increased. In other embodiments, the $T'_i$ interval may be increased only after a series of too-brief periods of supply voltage reduction, or when such periods occur above a threshold frequency. Accordingly, method 36 provides a non-limiting example of a heuristic, according to which the various inactivity thresholds may be adjusted. Likewise, at 56 it is determined whether the powered-down period was too brief. If the powered-down period was too brief, then the method advances to 58, where the $T_i$ threshold is lengthened.

It will be emphasized that all of the embodiments disclosed herein are usable separately or together. For instance, the same PMU may be configured to enact data state recovering PM scheme 20 in addition to data-state preserving PM scheme 26. In this case, detection of a relatively short idle time may trigger a reduction in supply voltage, and detection of a longer idle time may trigger the saving of the logic state and subsequent nulling of the supply voltage. Furthermore, the approach of reducing the set-point of the voltage regulator may be used together with selective opening and closing of transistor switches on the component to affect a more efficient overall PM scheme. In one embodiment, relatively brief idle periods may trigger the latter strategy (because it admits of the shortest T5' and Tr' intervals) while somewhat longer idle periods may trigger the former. It is also contemplated that one or more of logic-device components, transistor switches, and PMUs may be arranged together on the same die or separately off die.

The articles, systems, and methods described hereinabove are embodiments of this disclosure-non-limiting examples for which numerous variations and extensions are contemplated as well. This disclosure also includes all novel and non-obvious combinations and sub-combinations of the above, articles, systems, and methods, and any and all equivalents thereof.

What is claimed is:

1. A method of managing leakage current in a logic device comprising:
   when the logic device is in an operating period, closing a plurality of switching elements coupled in parallel between a supply voltage and the logic device to distribute a supply voltage value over the logic device that is above an operational supply-voltage threshold;
   after the logic device enters an idle period for longer than an inactivity threshold, opening a first group of the plurality of switching elements, wherein a second group of the plurality of remain closed, to lower the supply voltage value distributed substantially uniformly over the logic device below the operational supply-voltage threshold but above a data-retention supply-voltage threshold; and
   when the logic exits the idle period, closing the first group of the plurality of switching elements switches to raise the supply voltage value distributed over the logic device above the operational supply-voltage threshold;

wherein the opening and closing of the plurality of switching elements are distributed substantially uniformly over the logic device to distribute the supply voltage value substantially uniformly over the logic device.

2. The method of claim 1 further comprising adjusting the inactivity threshold according to a heuristic.

3. The method of claim 1 wherein the logic device enters the operating period when a function or service of the logic device is requested.

4. The method of claim 1 wherein opening and closing the plurality of transistor switches includes addressing the transistor switches in a two or more groups that share a common control line.

5. The method of claim 4 wherein the two or more groups are addressed in sequence, separated by a settling period during which the supply voltage is allowed to settle before advancing to a lower or higher value.

6. The method of claim 1 further comprising determining a number of transistor switches to open or close.

7. The method of claim 1 wherein the idle period is a first idle period, the method further comprising:
after the logic device enters a second idle period longer than the first idle period, opening the plurality of switching elements to lower the supply voltage value distributed over the logic device below the data-retention supply-voltage threshold; and
when the logic exits the second idle period, closing the plurality of switching elements to raise the supply voltage value distributed substantially uniformly over the logic device above the operational supply-voltage threshold.

8. A device exhibiting reduced leakage current, the device comprising:
a voltage supply line;
a component having an operational supply-voltage threshold for maintaining operation and a data-retention supply-voltage threshold for retaining data;
a plurality of transistor switches, arranged in parallel, to selectively couple the voltage supply line to the component, each transistor switch having a gate terminal to control whether the transistor switch is open or closed; and
a power-management unit operatively coupled to the gate terminal of each transistor switch, wherein the power management unit is configured to open one or more of the plurality of transistor switches distributed substantially uniformly over the component to lower a voltage supplied over the component from the voltage supply line below the operational supply-voltage threshold but above the data-retention supply-voltage threshold after the component enters an idle period, and to close the plurality of transistor switches to maintain the voltage supplied substantially uniformly over the component from the voltage supply line to a voltage level above the operational a supply-voltage threshold when the component exits the idle period.

9. The component of claim 8, wherein the power-management unit is configured open one or more of the plurality of transistors to lower the voltage below the operational supply-threshold but above the data-retention supply-voltage threshold when a period of component inactivity exceeds an inactivity threshold, and close the plurality of transistors to raise the voltage above operational supply-voltage threshold when a function or service of the component is requested.

10. The component of claim 8, wherein the transistor switches include field-effect transistors.

11. The component of claim 8, wherein the transistor switches are distributed over the component and grouped into a plurality of zones, each zone supplying power to a nearest region of the component.

12. The component of claim 8 wherein the voltage supply line, the component, the plurality of transistor switches, and the power-management unit are arranged on a same die.

13. A device exhibiting reduced leakage current comprising:
logic having an operational supply-voltage threshold for maintaining operation and a data-retention supply-voltage threshold for retaining data;
distributed over the logic, two or more zones of transistor switches, the transistor switches of each zone connected in parallel with gate terminals connected to a common control line, each zone switchably connecting a voltage supply substantially uniformly across a nearest region of the logic; and
a power-management unit operatively coupled to the control line of each zone and configured to open one or more zones of the transistor switches to lower a voltage supplied over the logic to below the operational supply-voltage threshold but above the voltage above the data-retention supply-voltage threshold when a period of inactivity of the logic exceeds a first inactivity threshold.

14. The device of claim 13, wherein the power-management unit is further configured to close all zones of the transistor switches to raise the voltage supplied over the logic to above the operational supply-voltage threshold when a function or service of the logic is requested.

15. The device of claim 13, wherein the power-management unit is further configured to:
close all zones of the transistor switches to raise the voltage supplied over the logic to above the operational supply-voltage threshold when the period of inactivity of the logic exceeds a second inactivity threshold;
save a state of the logic after the voltage supplied over the logic is raised above the operational supply-voltage threshold when the period of inactivity of the logic exceeds a second inactivity threshold; and
open all zones of the transistor switches to lower a voltage supplied over the logic below the data-retention supply-voltage threshold after the state of the logic has been saved when the period of inactivity of the logic exceeds the second inactivity threshold.

16. The device of claim 15, wherein the power-management unit is further configured to:
close all zones of the transistor switches to raise the voltage supplied over the logic to above the operational supply-voltage threshold when a function or service of the logic is requested; and
restore the state of the logic after the voltage supplied over the logic is raised above the operational supply-voltage threshold.

17. The device of claim 15, wherein the state of the logic comprises a state of one or more of a register file, a cache, and a bit.

18. The device of claim 15, wherein the power-management unit is further configured to;
   adjust the first inactivity threshold according to a first heuristic; and
   adjust the second inactivity threshold according to a second heuristic.

* * * * *